(12) United States Patent
Smith

(10) Patent No.: US 6,974,213 B1
(45) Date of Patent: Dec. 13, 2005

(54) MONOBLOCK ASSEMBLY FOR EYEWEAR

(75) Inventor: Greg Smith, Plano, TX (US)

(73) Assignee: E'lite Optiks, Inc., Carrollton, TX (US)

( * ) Notice: Subject to any disclaimer, the term of this patent is extended or adjusted under 35 U.S.C. 154(b) by 14 days.

(21) Appl. No.: 10/856,605

(22) Filed: May 28, 2004

(51) Int. Cl.$^7$ .............................................. G02C 5/14
(52) U.S. Cl. ...................... 351/121; 351/90; 351/47; 351/157
(58) Field of Search ............... 351/90–102, 111, 351/119, 121, 156, 157, 47, 48, 57, 58

(56) References Cited

U.S. PATENT DOCUMENTS

| | | | |
|---|---|---|---|
| 2,564,961 A | * | 8/1951 | Culver et al. ............... 351/93 |
| 3,238,005 A | | 3/1966 | Petitto |
| 3,252,747 A | | 5/1966 | Robins |
| 4,070,103 A | | 1/1978 | Meeker |
| 4,405,212 A | | 9/1983 | Cooper |
| 4,785,481 A | | 11/1988 | Palmer, III et al. |
| 5,189,447 A | | 2/1993 | Oleson |
| 5,339,119 A | | 8/1994 | Gardner |
| 5,410,763 A | | 5/1995 | Bolle |
| 5,416,537 A | | 5/1995 | Sadler |
| 5,568,207 A | | 10/1996 | Chao |
| 5,796,461 A | | 8/1998 | Stephan |
| 6,062,688 A | | 5/2000 | Yinas |
| 6,089,708 A | | 7/2000 | Ku |
| 6,149,269 A | | 11/2000 | Madison |
| 6,301,953 B1 | | 10/2001 | Zamfes |
| 6,474,811 B2 | | 11/2002 | Liu |
| 6,641,263 B2 | | 11/2003 | Olney |
| 6,749,299 B1 | | 6/2004 | Hsu |
| 6,789,273 B2 | | 9/2004 | Markovitz |

\* cited by examiner

*Primary Examiner*—Huy Mai
(74) *Attorney, Agent, or Firm*—Storm LLP; John G. Fischer

(57) ABSTRACT

The present invention relates to eyewear, and in particular, for a single block assembly having multiple slots and reliefs in substantial alignment for accommodation of a flange for lens attachment, a flange for arm attachment, a magnet location, and an accessory slot. The accessory slot can accommodate attachment of a variety of accessories, including a pivotal auxiliary lens assembly, a stationary auxiliary lens assembly, or a tether cord. The single block design provides a reduced profile which allows the frame to accommodate wider lenses for improved peripheral visibility and improved appearance.

4 Claims, 7 Drawing Sheets

MONOBLOCK ASSEMBLY FOR EYEWEAR

TECHNICAL FIELD OF INVENTION

The present invention relates to eyewear, and in particular, for a unitary assembly block for lens attachment, leg attachment, and accessory slot. The accessory slot can accommodate attachment of a variety of accessories, including a pivotal auxiliary lens assembly, a stationary auxiliary lens assembly, and a tether cord. The single block design provides a reduced profile which allows the frame to accommodate wider lenses for improved peripheral visibility and improved appearance.

BACKGROUND OF THE INVENTION

It has long been desirable to have a removable auxiliary lens assembly attached to eyeglasses. Professional baseball players have used "flip-up" auxiliary lenses for more than four decades to protect their eyes from the sun, but to allow them unrestricted vision in the event the ball was hit in their vicinity.

U.S. Pat. No. 3,252,747 to Robins discloses an eyewear system specifically designed for persons who are far-sighted. The device includes an assembly in which an auxiliary frame assembly containing lenses may be rotated about the horizontal axis and remain attached to a primary assembly so as to locate the lenses the proper distance to the eyes every time the device is lowered into place. A significant disadvantage of this design is that it is unattractive, overly complicated, impossible to segregate from the primary frame, and does not accommodate anyone other than far-sighted individuals.

U.S. Pat. No. 6,089,708 to Ku discloses a connecting member having spaced connecting plates for attachment to the bridge portion of a primary lens assembly. The connecting plates have magnetic members that act cooperatively with a complimentary magnetic member inserted in a hole on the bridge. The front of the connecting part has an open communication to a polygonal-shaped holding room. The auxiliary frame has connecting rods extending above the bridge portion, and supporting an intermediate portion having a polygonal shape, receivable and rotatable in the holding room. A significant disadvantage of this design is that it is unattractive, overly complicated, and resists easy and immediate removal of the auxiliary lens assembly.

U.S. Pat. No. 3,238,005 to Petitto discloses the combination of a primary lens assembly and auxiliary lens assembly. The auxiliary assembly has flexible side wall projections with openings that can be assembled onto lugs (pins) extending perpendicularly from the sides of the primary assembly, allowing the auxiliary assembly to be pivoted upwards, and back downwards. Leaf springs mounted on the auxiliary assembly engage surfaces of the primary assembly to urge the auxiliary assembly into position. A significant disadvantage of this design is that it is unattractive, overly complicated, and resists easy and immediate removal of the auxiliary lens assembly.

As stated, these and other mechanically clipped on devices for holding auxiliary lenses are cumbersome and unattractive. More recently, numerous attempts have been made to magnetically attach an auxiliary lens assembly to a primary lens assembly.

U.S. Pat. No. 4,070,103 to Meeker discloses a primary lens assembly having a slidably attachable auxiliary lens assembly. In this device, the primary lens assembly is made of magnetizable material and auxiliary lenses are individually securable to the primary lens assembly by a magnetic band inserted in a groove on the inside surface of the individual auxiliary lens assembly. This design is not pivotal, and the auxiliary assembly must be physically removed.

U.S. Pat. No. 5,416,537 to Sadler discloses a primary lens assembly having a first magnetic member attached vertically to the front surface of the primary lens assembly, and a second magnetic member attached in a corresponding position on the back surface on an auxiliary lens assembly. The magnetic members are arranged for engagement to secure the auxiliary lens assembly to the primary lens assembly. This design is not pivotal, and the auxiliary assembly must be physically removed.

U.S. Pat. No. 5,568,207 to Chao also discloses a magnetically adhered auxiliary lens assembly, with the additional feature of arms extending from the side portions of the auxiliary lens assembly, over magnet retaining projections and extensions of the primary lens assembly. The arms engage with, and are supported on, the primary lens assembly extensions to prevent disengagement of the auxiliary lens assembly upon downward movement of the auxiliary lens assembly relative to the primary lens assembly. This design is not pivotal, and the auxiliary assembly must be physically removed.

Auxiliary eyewear systems such as those described above require the auxiliary frame assembly be removed from the primary frame assembly, and then handled and stored separately when it is necessary for the eyeglass wearer to look only through the lenses of the primary frame assembly. They do not enjoy the advantages of the early flip-up designs, which permitted quick movement of the auxiliary assembly out of alignment with the primary assembly without separating them from the primary assembly.

U.S. Pat. No. 6,474,811 to Liu discloses a magnetically attached auxiliary lens assembly in which the auxiliary assembly can be magnetically attached to the either the inside or outside of extensions having magnets on the primary assembly. The auxiliary assembly is pivotal upwards, removing the pivotal alignment of the auxiliary and primary lenses. A significant disadvantage of this design is that it is unstable, relying on tenuous repositioning, and magnetic forces alone to align and support the auxiliary assembly relative to the primary assembly. Another significant disadvantage of this design is that causes the auxiliary frame to be positioned into the forehead of the wearer, making raising the auxiliary assembly fully perpendicular to the primary assembly impractical.

U.S. Pat. No. 6,301,953 to Xiao discloses an auxiliary lens assembly having pivots mounted above the lenses and attached by long, L-shaped shelter arms. The shelter arms are attached to supporting arms having magnet holding housings attached at their ends. Magnets are inset in the housings for engagement over rearwardly protruding rim lockers. One disadvantage of this design is that it is fails to limit the rotation of the auxiliary lens assembly. Another disadvantage is that it is esthetically unappealing, due in part to the long shelter arm requirement. Another disadvantage is that it relies on a bridge magnet or bride hook for stability. Another disadvantage is that the device relies on magnetic force to pull the magnetic housing forward, over a rearward protruding lens locker, requiring the user push the auxiliary frame awkwardly rearward, into the primary frame, to disengage the magnetic housing from over the lens locker. Another disadvantage is that the device is complex and expensive to manufacture.

An improvement to these designs is disclosed in a co-owned and co-pending U.S. patent application entitled "Rotatable And Removable Auxiliary Eyewear System With Snap Alignment." The application discloses an auxiliary eyewear support system that utilizes pivotal hinges integral to the auxiliary frame, which permit rotation of the auxiliary frame from a first position in which the auxiliary lenses are substantially parallel to the primary frame lenses, to a second position in which the auxiliary frame assembly is flipped up substantially perpendicular to the orientation of the primary frame assembly.

Each of these systems discloses a primary frame that has a single function attachment means for attaching a singular style of auxiliary lens assembly. In addition, most of these designs require a lens that is limited in width, so as to accommodate the attachment apparatus outside of the mechanism securing the lens to the frame. As a result, peripheral vision through the lens is limited. This can give rise to both convenience and safety issues. For example, a nearsighted person trying to change lanes on a freeway is forced to rotate their head significantly further around to allow alignment of their eye through their lens in the direction of the vehicle blind-spot. These processes increase the time required to affect the maneuver, and requires and increased time in which the direction in which the car is traveling at high speed is not visible. Problems occur again when trying to back-up a vehicle.

In addition to auxiliary lens assemblies, it is often convenient to attach tethers, or chords, to a primary lens assembly to allow for temporary removal of the assembly, without the need to set them down or hold them. It is always required to provide an attachment means to the end of the chord to secure it to the eyeglass assembly.

It can thus be seen that there is a need to develop a design for a primary lens assembly in which the primary frame assembly can be adapted to accept multiple styles of attachable auxiliary lens assemblies. There is also a need to provide such a device that permits insertion of wider lenses to improve peripheral vision. There is also a need to simplify the structure and assembly of primary lens assemblies. There is also a need to provide a primary lens assembly that is easily attachable to a chord that is not specially configured at its ends.

SUMMARY OF THE INVENTION

A primary advantage of the present invention is that it provides a primary lens assembly that is adapted to receive multiple styles of auxiliary lens assemblies. Another advantage of the present invention is that it permits insertion of wider lenses to improve peripheral vision. Another advantage of the present invention it is adapted to be easily attachable to a chord that is not specially configured at its ends.

Another advantage of the present invention is that it is simple and aesthetically attractive. Other advantages of the present invention will become apparent from the following descriptions, taken in connection with the accompanying drawings, wherein, by way of illustration and example, an embodiment of the present invention is disclosed. As referred to hereinabove, the "present invention" refers to one or more embodiments of the present invention which may or may not be claimed, and such references are not intended to limit the language of the claims, or to be used to construe the claims in a limiting manner.

In accordance with one aspect of the invention, there is provided a primary lens assembly retaining a pair of primary lenses. The primary lens assembly includes a primary frame. In a first preferred embodiment, the left and right sides of the primary frame are separated at the upper and outer sides to allow placement of the primary lenses. A flange is attached to a first end of the separation in the frame. A block is attached to the second, opposite end of the separation in the frame. It is understood by one of ordinary skill in the art that the block or the flange may be on that portion of the separation that is on top or on bottom, so long as a flange is adjacent to a block.

The block has a contoured receptacle for receiving the flange. In the preferred embodiment, the flange has a hole for location of a threaded connector. The block is threaded to receive the threaded end of the threaded connector. The threaded connector attaches the separated ends of the primary frame together in a manner that compressively secures the primary lenses within the primary frame.

In the preferred embodiment of the present invention, a vertical slot is located in rearward alignment with the contoured receptacle. A horizontal slot is located rearward of the vertical slot, receivable of a pivot of an arm. In this manner, general alignment of the receptacle, vertical slot, and horizontal slot provides a uniquely narrow configuration that extends further rearward than conventional designs. This permits utilization of wider lenses to achieve a higher angle of corrected peripheral vision. Additionally, it permits a single block manufacturing of a multi-functional extension.

An auxiliary lens assembly retains a pair of auxiliary lenses. The auxiliary lens assembly may be attached to the primary lens assembly. In this manner, the person wearing the eyewear system has two lenses combining to alter the transmission of light to each eye.

In a preferred embodiment, the primary lenses are corrective lenses and the auxiliary lenses are light transmission reducing lenses, for example, a polarizing, absorbing, refracting, photochromatic, or reflecting lenses, or any combination thereof (i.e., sunglasses). In a preferred embodiment, the primary lenses are impact resistant safety lenses and the auxiliary lenses are light transmission reducing lenses, such as welding lenses. In another preferred embodiment, the primary lenses are corrective lenses and the auxiliary lenses are corrective lenses. In another preferred embodiment, the primary lenses are corrective lenses and the auxiliary lenses are impact resistant safety lenses.

In one embodiment, the auxiliary lens assembly has an arm extending rearward from the upper and outer sides of the auxiliary lens assembly. An engagement unit is attached to the end of the arm for location in the vertical slot of the primary lens assembly. In a first preferred embodiment, the engagement unit is a compressible material dimensionally wider the vertical slot, such that an interference fit is created when the auxiliary lens assembly is placed onto the primary lens assembly. In a second preferred embodiment, the engagement unit includes an auxiliary magnet for magnetic attachment to the primary lens assembly.

In a more preferred embodiment, a primary magnet is located between the contoured relief and the vertical slot. The magnet provides an alternative, or additional, attachment force when an auxiliary lens assembly having an auxiliary magnet is attached to the primary lens assembly.

In another preferred embodiment, a tether is passed through the vertical slot. The tether may have a knot tied in the end, or is otherwise restricted from sliding completely out of the vertical slot.

In another preferred embodiment, the horizontal slot and the vertical slot form perpendicular forks, such that each slot has an opening that prevents the slot from being enclosed.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The terms "right" and "left" as used herein are referenced from the perspective of a person wearing the primary and auxiliary lens assemblies. The references are intended to aide in the description of the device, and are not intended to be limiting, since the preferred embodiments of the device are generally symmetric.

Figure 1:
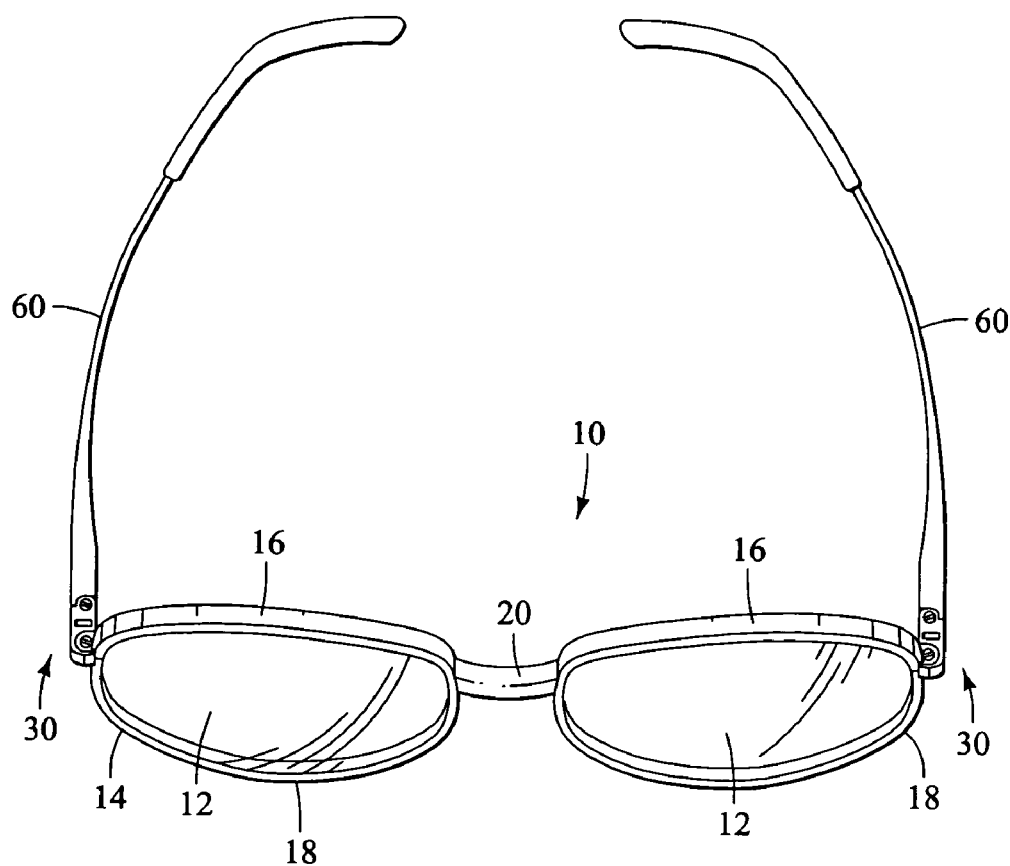
FIG. 1 is an isometric view of a primary lens assembly in accordance with a preferred embodiment of the present invention.

FIG. 1 is an isometric view of a preferred embodiment of the present invention. In this view, a primary lens assembly 10 is illustrated in accordance with a preferred embodiment of the present invention. Primary lens assembly 10 has a pair of lenses 12. In the embodiment shown, lenses 12 are secured in place by primary frame 14. In the preferred embodiment, primary frame 14 has an upper portion 16 and a lower portion 18.

A bridge portion 20 connects the left and right sides of primary frame 14 for positioning lenses 12 relative to each other, and for supporting primary lens assembly 10 on the face of the person wearing lens assembly 10. A monoblock 30 is attached to each lower portion 18 of primary frame 14. An arm 50 is attached to each monoblock 30.

Figure 2:
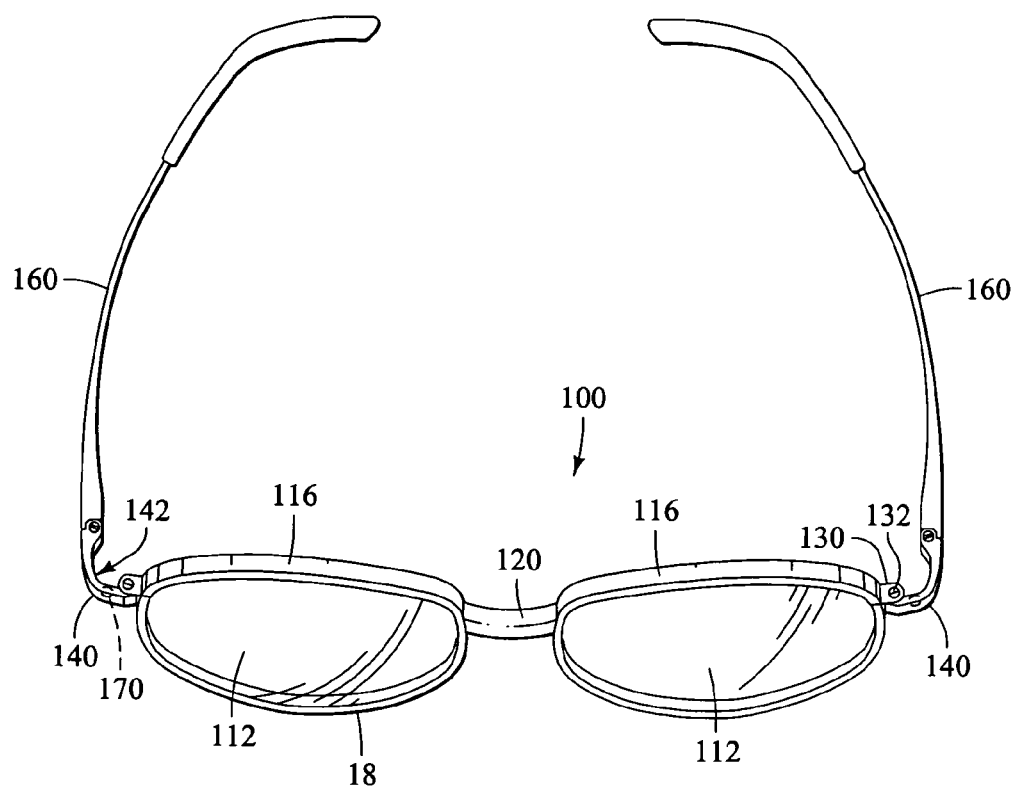
FIG. 2 is an isometric view of a prior art primary lens assembly.

FIG. 2 is an isometric view of a prior-art primary lens assembly 100. In the prior art devices, an upper portion 116 and a lower portion 118 of a primary frame 114 are divided by a split at each side to allow insertion and removal of lenses 112. A bridge portion 120 connects the left and right sides of primary frame 114 for positioning lenses 112 relative to each other, and supporting primary lens assembly 110 on the face of the person wearing lens assembly 110. An upper projection portion 130 is attached to the end of each upper portion 116, above the split, by soldering or other method. A lower projection portion 132 (not visible) is attached to the end of each lower portion 118, below the split, also by soldering or other method. Lower projection portion 132 is typically near in width to the lower portion 118 surrounding lenses 112, and is insertable into a cavity, or relief, in the bottom of upper projection portion 130. A screw 134 secures lower projection portion 132 into upper projection portion 130, and thus contains lenses 112 within primary frame 114.

Still referring to the prior art, left and right extensions 140 are attached to the front face of upper projection portions 130, and extend laterally outward, beyond the ends of upper projection portions 130. Extensions 140 have a radial (or angular) bend 142, beyond which they extend rearwardly of upper projection portions 130 and the rear face of primary frame 114. An arm 160 is pivotally attached to the end of the rearwardly extending portion of each extension 140.

Primary frame magnets 170 may be embedded in upper projection portions 130, laterally outbound beyond of the location of screws 134 connecting upper and lower projection portions 130 and 132 respectively. Primary frame magnets 170 may alternatively be located in the rear of extensions 140, again, laterally outbound and beyond of the location upper and lower projection portions 130 and 132 respectively. Primary magnets 170 provide a magnetic attachment point for auxiliary frames (not shown). As seen from FIG. 2, the laterally outward sequence of projections 130/132, magnets 170, and radial bends 142 of extensions 140, collectively define an assembly length of primary lens assembly 110. Since the distance between arms 160 is limited to the sizes adaptable to be worn by the public, there is a consequential reduction and limitation to the width of the lenses 112. This limitation inhibits the peripheral visibility through the prior art designs.

Figure 3:
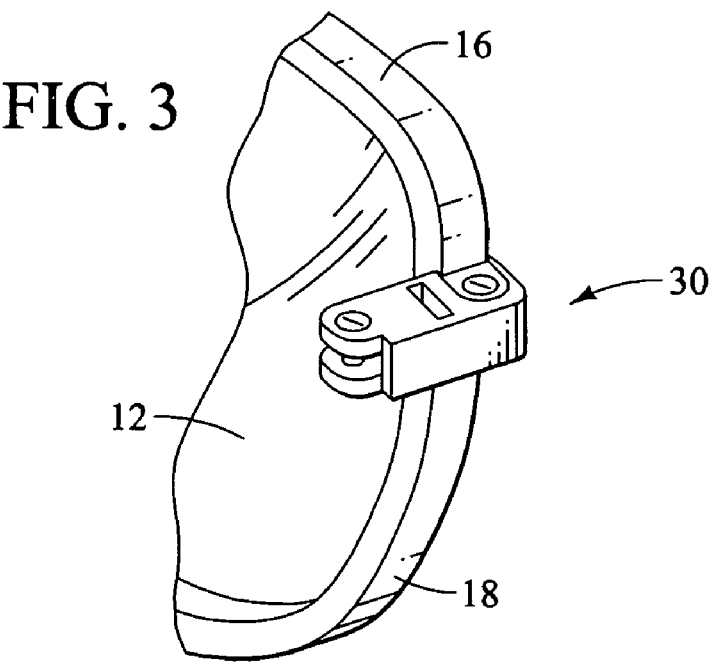
FIG. 3 is an isometric view breakout view of the preferred embodiment disclosed in FIG. 1, illustrating the monoblock component of the present invention.

FIG. 3 is an isometric view breakout view of the preferred embodiment disclosed in FIG. 1, illustrating monoblock component 30 of the present invention, securing upper portion 16 to lower portion 18.

Figure 4:
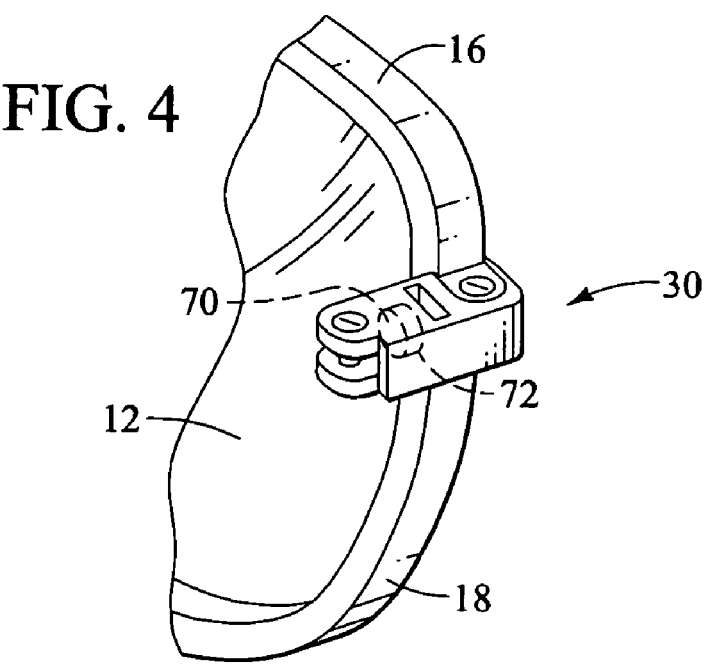
FIG. 4 is an isometric view breakout view of another preferred embodiment of the present invention, illustrating a magnet mounted within the monoblock.

FIG. 4 is an isometric view breakout view of another preferred embodiment of the present invention, illustrating a primary magnet 70 secured in a magnet relief 72 within monoblock 30.

Figure 5:
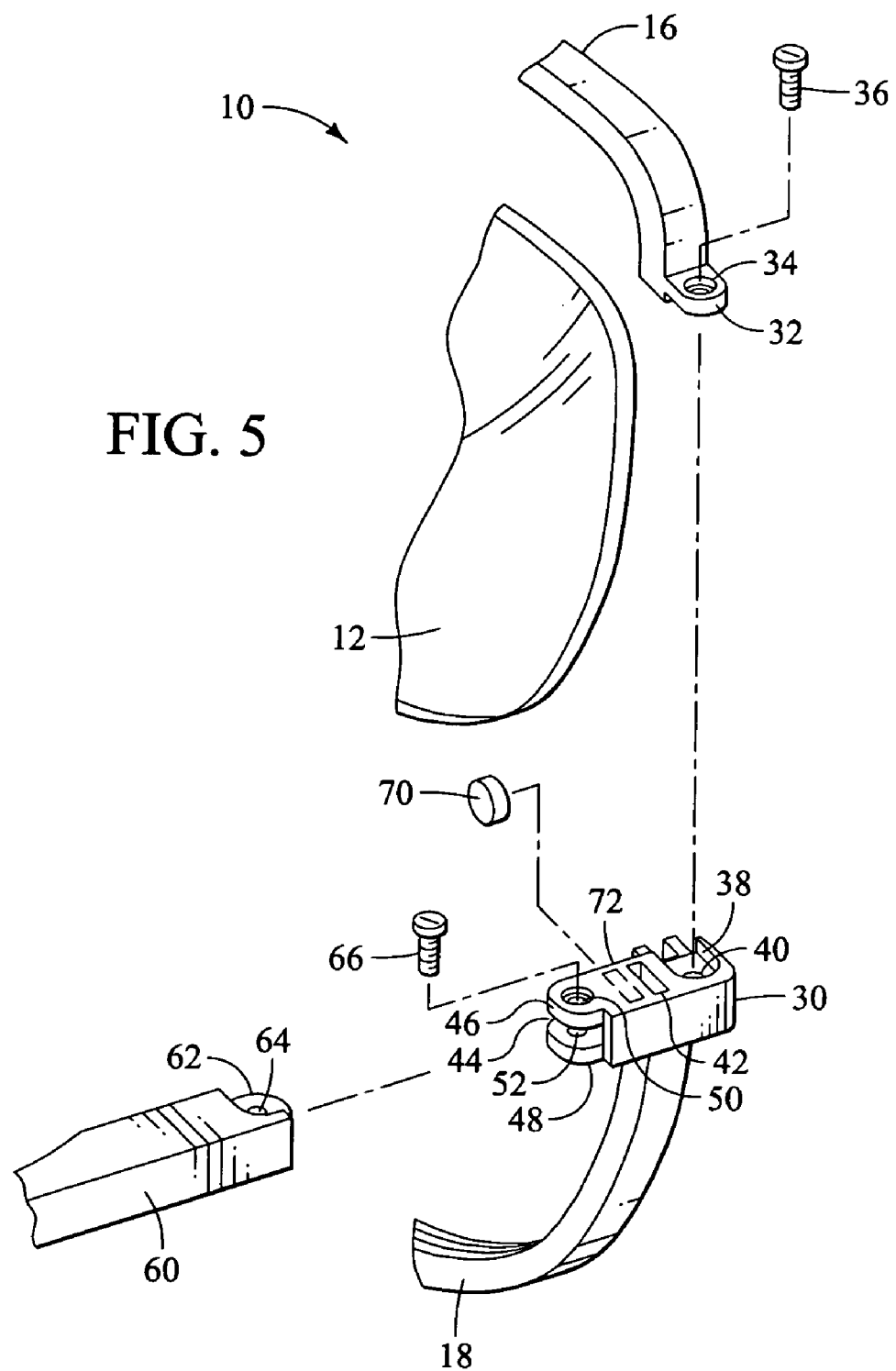
FIG. 5 is an exploded isometric break-out view, illustrating the assembly of the primary frame assembly, including a preferred embodiment of the monoblock assembly.

FIG. 5 is an exploded isometric break-out view of the embodiment disclosed in FIG. 4, illustrating primary frame assembly 10, including a preferred embodiment of monoblock 30. As seen in this view, monoblock 30 is attached to the end of lower portion 18 of frame 12. A flange 32 is attached to the end of upper portion 16 of frame 12. In the preferred embodiment, flange 32 has a countersunk screw hole 34 receivable of a screw 36. Monoblock 30 has a relief 38 for receiving flange 32. A threaded screw hole 40 is located beneath relief 38 for threaded engagement with screw 36.

A vertical slot 42 is located in rearward alignment with relief 38. A horizontal slot 44 is located in rearward alignment with vertical slot 42. Horizontal slot 44 may be comprised of an upper fork 46 and a lower fork 48 as shown. In this configuration, a countersunk screw hole 50 is located on upper fork 46. A threaded screw hole 52 is located on lower fork 48, in alignment with screw hole 50.

A pair of arms 60 are provided for wearing primary lens assembly 10. Each arm 60 has a pivot flange 62 at its end. A hole 64 is located on each pivot flange 62. Horizontal slot 44 is receivable of pivot flange 62. A screw 66 is provided for placement in holes 50 of upper fork 46, hole 64 of pivot flange 62, and for threaded engagement into hole 52 of lower fork 48. Assembled as described, arms 60 are pivotally attached to monoblock 30 in generally horizontal rotation. Interference between arm 60 and monoblock 30 limits the horizontal rotation of arms 60.

In a preferred embodiment, a primary magnet 70 is attached in rearward alignment behind vertical slot 42. Magnet 70 may be positioned in a magnet relief 72. In the preferred embodiment, magnet relief 72 is contoured to match the preferred embodiment cylindrical shape of primary magnet 70.

It is readily understood by one of ordinary skill in the art that the upper and lower arrangement between monoblock 30 and flange 32 could easily be reversed, without departing from the scope of the disclosure of the present invention. It is likewise understood that magnet 70 may be replaced with a magnetic member that is magnetically attractable to a magnet in an auxiliary frame.

Figure 6:
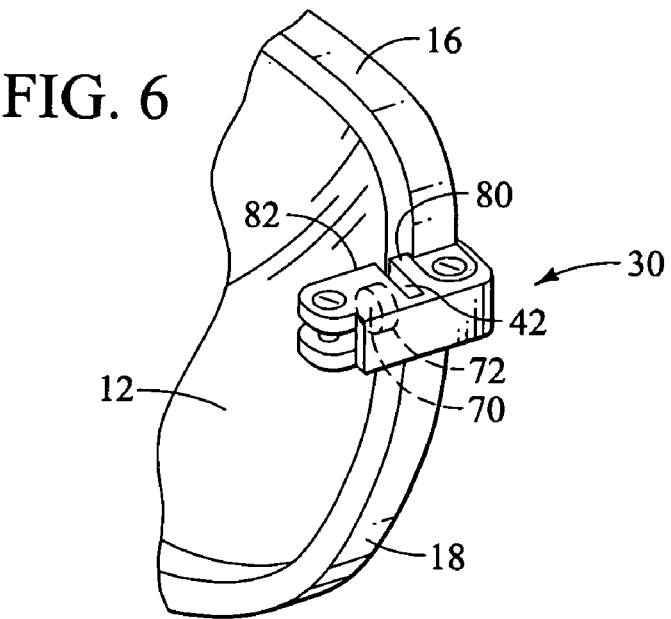
FIG. 6 is an isometric view breakout view of another preferred embodiment of the present invention, illustrating a magnet mounted within a monoblock configuration incorporating a vertical fork in perpendicular alignment with a horizontal fork.

FIG. 6 is an isometric breakout view of another preferred embodiment of the present invention, illustrating a configuration of monoblock 30 in which slot 42 is open-ended, forming a front fork 80 and a rear fork 82 directed horizontally inward, toward the center of primary lens assembly 10. This embodiment allows side, top, or bottom access for location of magnet 70 in magnet relief 72. As configured in this embodiment, slot 42 forms a vertical slot in perpendicular alignment with horizontal slot 44.

Figure 7:
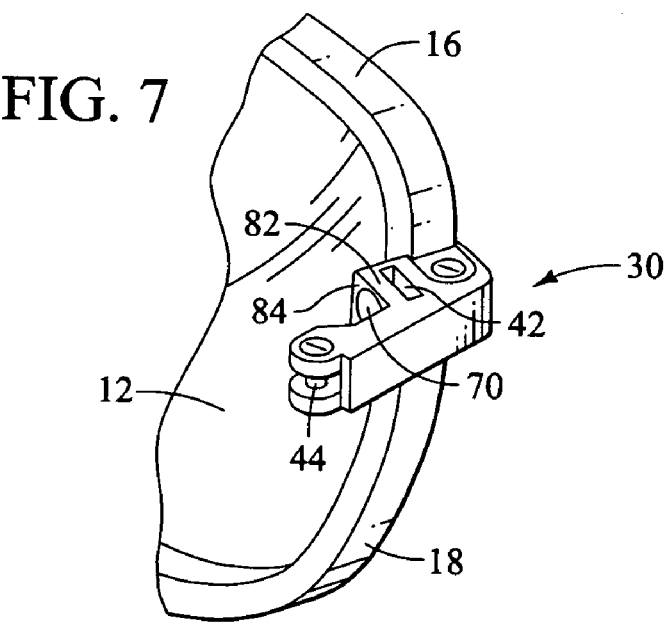
FIG. 7 is an isometric breakout view of another preferred embodiment of the present invention, illustrating a relieved monoblock configuration allowing easy access to a magnet.

FIG. 7 is an isometric breakout view of another preferred embodiment of the present invention, illustrating a configuration of monoblock 30 in which a relief 84 is provided in front of slot 44, such that rear fork 82 is readily accessible. This embodiment allows rear access for location of magnet 70 in magnet relief 72 in rear fork 82. Slot 42 may be open ended as shown in FIG. 6, or it may be enclosed as illustrated in FIG. 7.

Figure 8:
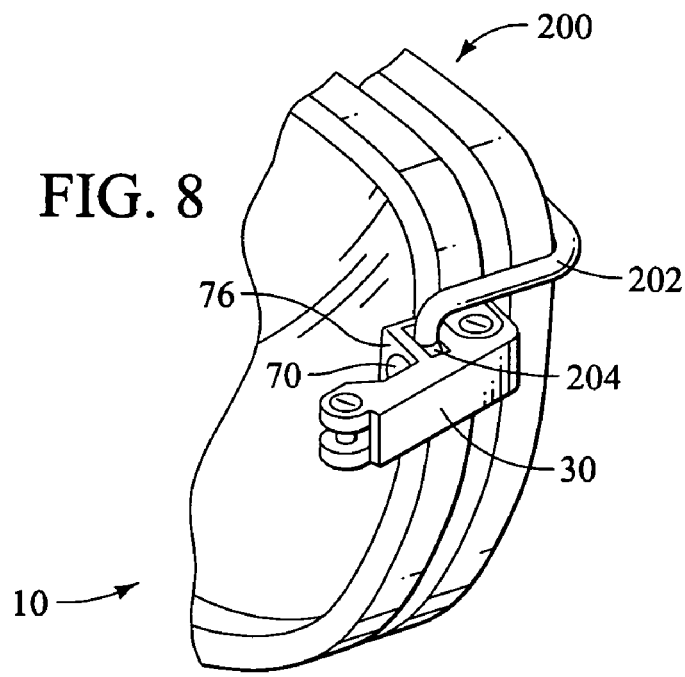
FIG. 8 is an isometric breakout view of the preferred embodiment disclosed in FIG. 7, illustrating the primary lens assembly and a non-rotatable auxiliary lens assembly attached, and illustrating mechanical and magnetic engagement between the primary lens assembly and the auxiliary lens assembly.

FIG. 8 is an isometric breakout view of the preferred embodiment disclosed in FIG. 7, illustrating primary lens assembly 10 with non-rotatable auxiliary lens assembly 200 attached, and illustrating mechanical and magnetic engagement between primary lens assembly 10 and auxiliary lens assembly 200. An arm 202 extends rearward of auxiliary lens assembly frame 200. A retaining ring 204 supports an auxiliary magnet 206 (not shown). Retaining ring 204 and auxiliary magnet 206 are positioned in slot 42 of monoblock 30. This provides a mechanical engagement of retaining ring 204 and auxiliary magnet 206. In the preferred embodiment shown, monoblock 30 includes a primary magnet 70 located in relief 75, on rear fork 84. In an alternative embodiment, a compressible bushing 208 (not shown) is located in retaining ring 204 for interference fit in slot 42.

Figure 9:
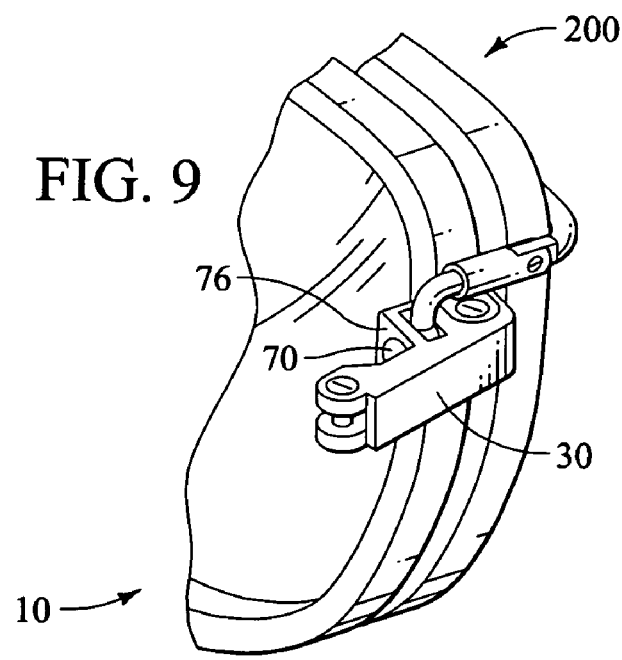
FIG. 9 is an isometric breakout view of the preferred embodiment disclosed in FIG. 7, illustrating the primary lens assembly and a rotatable auxiliary lens assembly attached, with the auxiliary lens assembly shown in the non-rotated position.

FIG. 9 is an isometric breakout view of the preferred embodiment disclosed in FIG. 7, illustrating primary lens assembly 10 having a rotatable auxiliary lens assembly 200 attached, with auxiliary lens assembly 200 shown in the non-rotated position.

Figure 10:
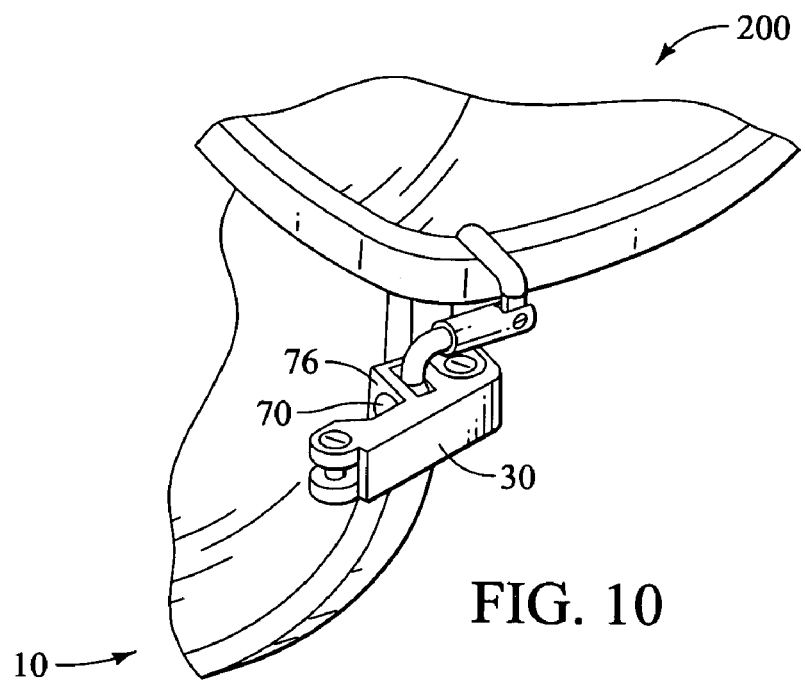
FIG. 10 is an isometric breakout view of the preferred embodiment disclosed in FIG. 9, illustrating the auxiliary lens assembly in the rotated position, and illustrating mechanical and magnetic engagement between the primary lens assembly and the auxiliary lens assembly.

FIG. 10 is an isometric breakout view of the preferred embodiment disclosed in FIG. 9, illustrating auxiliary lens assembly 200 in the rotated position, and illustrating mechanical and magnetic engagement between primary lens assembly 10 and auxiliary lens assembly 200.

Figure 11:
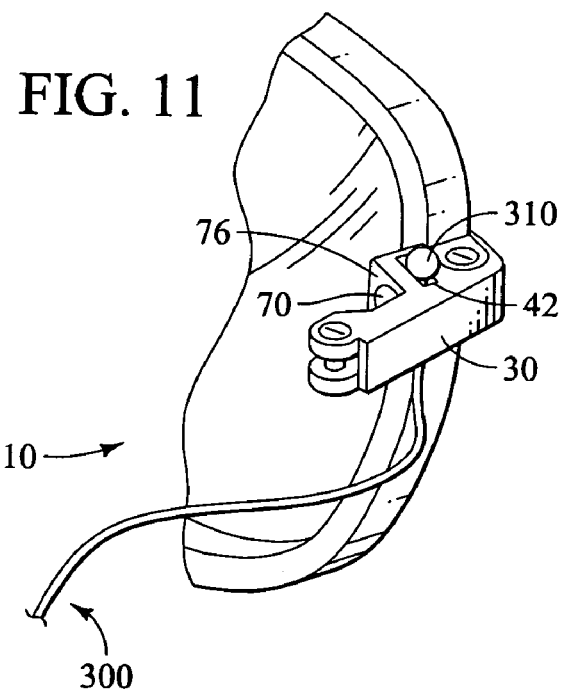
FIG. 11 is an isometric breakout view of the preferred embodiment shown in FIG. 10, illustrating a tether accessory attached to the vertical slot of the monoblock.

FIG. 11 is an isometric breakout view of a preferred embodiment, illustrating a tether accessory 300 attached to primary lens assembly 10 through vertical slot 42 of monoblock 30. As shown, a ball 310 at the end of tether 300 secures tether 310 in slot 42. In a preferred embodiment, ball 310 is compressible to permit compressed passage through vertical slot 42. Ball 310 may be replaced with a knot.

The preferred embodiments of primary frame 102 and auxiliary frame 202 illustrated surround the entire perimeter of primary lenses 106 and 107 and auxiliary lenses 206 and 207 respectively. Alternatively, primary frame 102 may only partially surround the perimeter of primary lenses 106 and 107. Likewise, auxiliary frame 202 may only partially surround the entire perimeter of auxiliary lenses 206 and 207. Such configurations are known in the industry as "open edge."

In another preferred embodiment, primary lenses 106 and 107 are attached directly to primary bridge 104. In this embodiment, slotted extensions 108 and 109 are attached directly to primary lenses 106 and 107. In another preferred embodiment, auxiliary lenses 206 and 207 are attached directly to auxiliary bridge 204. In this embodiment, auxiliary extensions 208 and 209 are attached directly to auxiliary lenses 206 and 207. Such configurations are known in the industry as "frameless."

OPERATION OF THE PREFERRED EMBODIMENTS

Auxiliary lens assembly 200 may be attached to primary lens assembly 10 be lowering auxiliary lens assembly 200 onto primary lens assembly 100 such that retaining rings 204 slide into slots 42. This requires only downward movement.

Referring to FIG. 5, primary frame assembly 10 of the present invention includes a preferred embodiment of monoblock 30. Monoblock 30 is attached to the end of lower portion 18 of frame 12. Monoblock 30 includes relief 38 for receiving flange 32, which is attached to the upper portion 16 of frame 12. Vertical slot 42 is located in substantial rearward alignment with relief 38. In the preferred embodiment, magnet 70 is located in substantial rearward alignment with vertical slot 42 and relief 38. Horizontal slot 44 is likewise then located in substantial rearward alignment with magnet 70, vertical slot 42, and relief 38.

It is seen by the description and the illustrations that use of monoblock 30 significantly reduces the lateral space required for attachment of auxiliary devices in slots 42, magnetic engagement with magnets 70 (or magnetic materials), and the attachment of arms 60. Since the distance between arms 60 is limited to the sizes adaptable to be worn by the public, there is a consequential increase in the potential width of lenses 12. The unique configuration of the present invention provides increased peripheral visibility over the prior art designs, and a substantially different esthetic appearance to the primary lens assembly.

In a first embodiment, no magnets are present in the device. In this embodiment, interference between compressible bushings 208 and vertical slot 42 of monoblock 30 secures auxiliary lens assembly 200 to primary lens assembly 10. As shown in FIG. 9 and FIG. 10 interference between compressible bushings 208 and vertical slot 42 of monoblock 30, and/or interference between retaining rings 204 and vertical slot 42 of monoblock 30, permit rotation of auxiliary lens assembly 200 between the raised and lowered positions.

In a second embodiment, primary magnets 70 are located in magnet reliefs 72 in monoblock 30. Magnets 70 may alternatively be magnetic materials. In this embodiment, magnetic engagement between magnets 70 (or magnetic materials) and auxiliary magnets 206 (or magnetic materials) provides additional stability and ease of attachment of auxiliary lens assembly 200 to primary lens assembly 100.

The various embodiments disclosed herein which include magnetic attraction will be appreciated by one of ordinary skill in the art to involve a combination of magnet-to-magnet magnetic engagement, or magnet-to-magnetic material magnetic engagement. "Magnetic material" as used herein is defined as materials subject to attraction by magnetic force, or magnetically attractable.

It will be readily apparent to those skilled in the art, and the general principles defined herein may be applied to other embodiments and applications without departing from the spirit and scope of the present invention.

I claim:

1. A monoblock extension for an eyewear assembly comprising:
    a contoured relief for receiving a flange;
    a vertical slot located in generally rearward alignment with the relief; and,
    a horizontal slot located in general rearward alignment of the vertical slot, the horizontal slot receivable of a pivot flange of an arm.

2. The monoblock extension of claim 1, further comprising:
    a magnet located between the contoured relief and the vertical slot.

3. A primary lens assembly comprising:
    a primary frame for securing a pair of lenses in relationship to each other; the primary frame comprising;
        a pair of opposite upper portions having a flange attached at their ends,
        a pair of lower portions having a monoblock extension attached at their ends, the monoblock extensions comprising;
            a contoured relief for receiving the flange of the upper portion;
            a vertical slot located in generally rearward alignment with the relief; and,
            a horizontal slot located in general rearward alignment of the vertical slot, the horizontal slot receivable of a pivot flange of an arm.

4. The primary lens assembly of claim 3, further comprising:
    a magnet located generally between the contoured relief and the vertical slot.

* * * * *